US012732055B2

(12) United States Patent
Purohit et al.

(10) Patent No.: US 12,732,055 B2
(45) Date of Patent: Sep. 8, 2026

(54) WIRE GUIDE AND RETENTION UNIT FOR POWER TOOL

(71) Applicant: Black & Decker Inc., New Britain, CT (US)

(72) Inventors: Madhur M. Purohit, Ellicott City, MD (US); Alastair G. Valentine, Baltimore, MD (US); Anjali Garg, Gambrills, MD (US); John B. Fogle, White Hall, MD (US); Timothy A. Smith, Perry Hall, MD (US); William J. Lennon, Charlotte, NC (US)

(73) Assignee: BLACK AND DECKER INC., New Britain, CT (US)

( * ) Notice: Subject to any disclaimer, the term of this patent is extended or adjusted under 35 U.S.C. 154(b) by 189 days.

(21) Appl. No.: 18/602,275

(22) Filed: Mar. 12, 2024

(65) Prior Publication Data

US 2024/0339885 A1 Oct. 10, 2024

Related U.S. Application Data

(60) Provisional application No. 63/494,408, filed on Apr. 5, 2023.

(51) Int. Cl.
*H02K 3/52* (2006.01)
*B25C 1/00* (2006.01)
(Continued)

(52) U.S. Cl.
CPC ............... *H02K 3/522* (2013.01); *B25C 1/06* (2013.01); *H02K 7/145* (2013.01); *B25C 1/008* (2013.01); *H02K 2203/06* (2013.01)

(58) Field of Classification Search
CPC .... H02K 3/522; H02K 7/145; H02K 2203/06; B25C 1/06; B25C 1/008; B25F 5/02
See application file for complete search history.

(56) References Cited

U.S. PATENT DOCUMENTS 7,675,206 B2 3/2010 Akutsu et al.
8,188,393 B2 * 5/2012 McCormick ........... H01H 9/063 200/293

(Continued)

FOREIGN PATENT DOCUMENTS

DE 102012216127 A1 3/2014
EP 1493537 B1 1/2007

(Continued)

OTHER PUBLICATIONS

Extended European Search Report mailed Oct. 10, 2024 in corresponding EP application No. 24164088.7, 8 pages.

*Primary Examiner* — Tulsidas C Patel
*Assistant Examiner* — Mohammed Ahmed Qureshi
(74) *Attorney, Agent, or Firm* — Womble Bond Dickinson (US) LLP

(57) ABSTRACT

A power tool includes a housing including a motor case and a handle; a motor disposed within the motor case and having motor lead wires; a battery receiving portion provided on an end of the handle configured to receive a removable battery pack; a control unit configured to receive electric power form the battery pack and output power wires; and a wire guide and retention unit disposed within the handle. The wire guide and retention unit includes a main body and ring terminals fastened to the main body. The ring terminals couple with the motor lead wires on one end and with the power wires on another end.

12 Claims, 5 Drawing Sheets

(51) Int. Cl.
*B25C 1/06* (2006.01)
*H02K 7/14* (2006.01)

(56) References Cited

U.S. PATENT DOCUMENTS

| | | | | |
|---|---|---|---|---|
| 9,833,890 | B2 | 12/2017 | Ito et al. | |
| 9,978,541 | B2 | 5/2018 | Mizutani et al. | |
| 10,084,360 | B2 | 9/2018 | Aoyama | |
| 10,541,588 | B2 | 1/2020 | Wachter et al. | |
| 10,608,501 | B2 | 3/2020 | Ekstrom et al. | |
| 10,630,008 | B2 | 4/2020 | Volpin et al. | |
| 10,630,135 | B2 | 4/2020 | Sengiku et al. | |
| 11,095,193 | B2 | 8/2021 | Wachter et al. | |
| 2022/0336904 | A1* | 10/2022 | Friedman ............ | H01M 50/247 |

FOREIGN PATENT DOCUMENTS

| | | | |
|---|---|---|---|
| EP | 1780844 | A1 | 5/2007 |
| EP | 1281485 | B1 | 6/2010 |
| EP | 2263836 | A2 | 12/2010 |
| EP | 1742770 | B1 | 6/2012 |
| EP | 2471633 | A2 | 7/2012 |
| EP | 3407472 | B1 | 7/2021 |
| EP | 4079457 | A1 | 10/2022 |
| JP | 7012281 | B2 | 1/2022 |

* cited by examiner

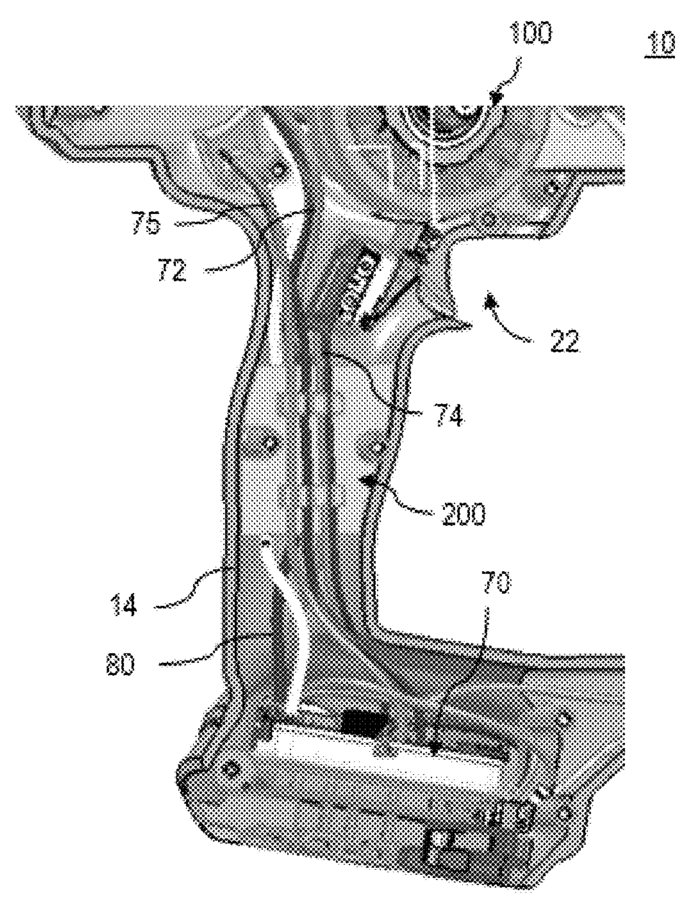
FIG. 4A
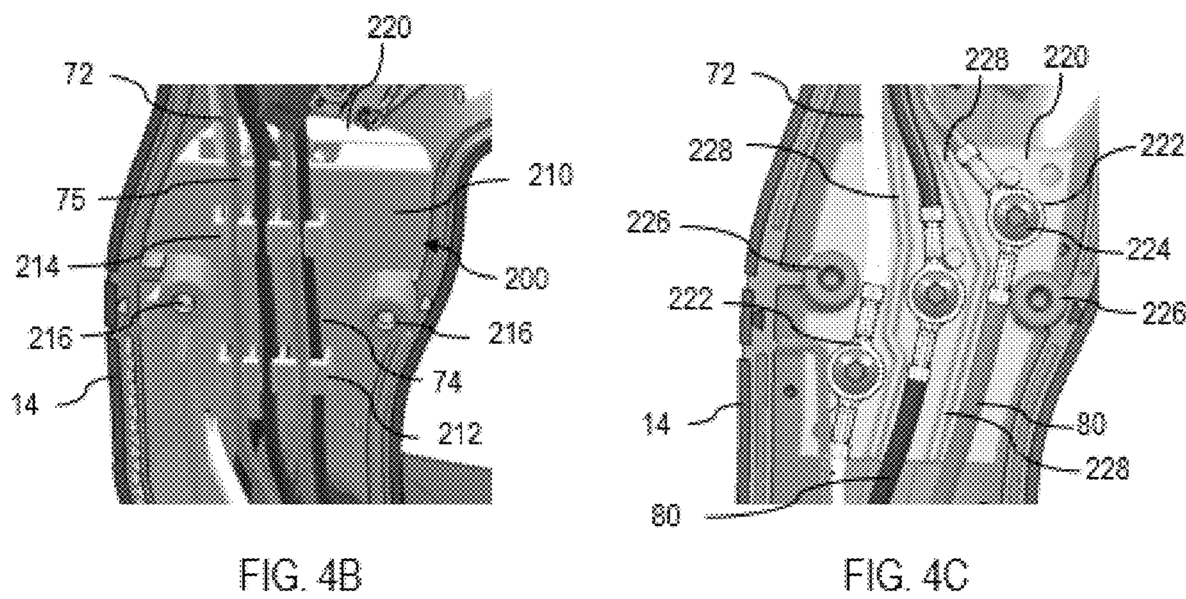
FIG. 4B
FIG. 4C

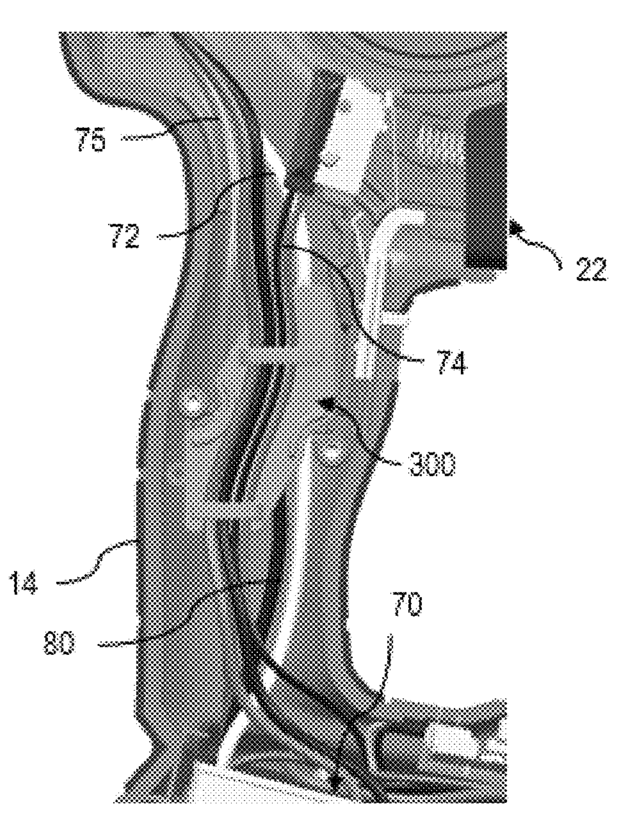
FIG. 5A
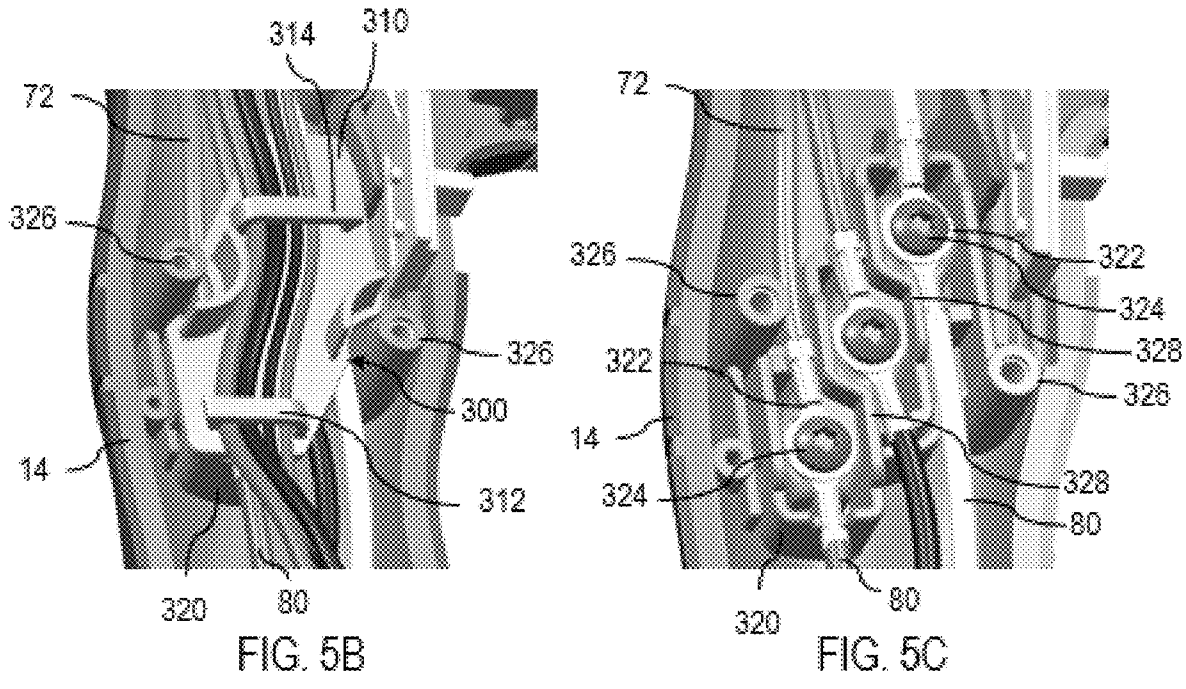
FIG. 5B
FIG. 5C

WIRE GUIDE AND RETENTION UNIT FOR POWER TOOL

RELATED APPLICATION

This utility patent application claims the benefit of U.S. Provisional Patent Application No. 63/494,408, filed Apr. 5, 2023, content of which is incorporated herein by reference in its entirety.

FIELD

This application relates to a power tool, and in particular to a wire guide and retention unit for interconnection of wires between a motor and a control electronics circuit.

BACKGROUND

A brushless DC motor includes a rotor for providing rotational energy and a stator for supplying a magnetic field that drives the rotor. Comprising the rotor is a shaft supported by a bearing set on each end and encircled by a permanent magnet (PM) that generates a magnetic field. The stator includes a stator core with radially projecting teeth on which sets of magnet wires are wound and connected together in either a three-phase wye or Delta configuration. Each of the windings is oriented such that it lies parallel to the rotor shaft. Power devices such as MOSFETs are configured as a three-phase inverter circuit and are connected in series with each of the magnet wire windings to enable power to be selectively applied. When power is applied to a winding, the resulting current in the winding generates a magnetic field that couples to the rotor. The magnetic field associated with the PM in the rotor assembly attempts to align itself with the stator generated magnetic field resulting in rotational movement of the rotor. A control circuit sequentially activates the individual stator coils so that the PM attached to the rotor continuously chases the advancing magnetic field generated by the stator windings.

In power tool applications, the motor may be an inner-rotor motor with the rotor having a core mounted on a shaft and rotatably disposed within the stator. Alternatively, the motor may be an outer-rotor motor with the rotor having a cylindrical body that receives an inner stator therein. In some power tools such as electric nailers, outer-rotor motors may be utilized in combination with an integrated flywheel to engage a driver for driving fasteners.

Motor control electronics may be positioned within the power tool adjacent the motor or at a location far from the motor. What is needed is a mechanism for proper guiding and retention of power wires and other signal/control wires between the motor and other components.

This section provides background information related to the present disclosure and is not necessarily prior art.

SUMMARY

According to an embodiment, a power tool is provided including: a housing including a motor case and a handle; a motor disposed within the motor case, the motor including a rotor and a stator having a plurality of windings, wherein a plurality of motor lead wires extends from the plurality of windings; a battery receiving portion provided on an end of the handle configured to receive a removable battery pack; a control unit configured to receive electric power form the battery pack and output a plurality of power wires; and a wire guide and retention unit disposed within the handle, the wire guide and retention unit including a main body and a plurality of ring terminals fastened to the main body, the plurality of ring terminals being configured to couple with the plurality of motor lead wires on one end and with the plurality of power wires on another end.

In an embodiment, the wire guide and retention unit includes a main body including a plurality of elongate walls forming a plurality of channels therebetween, wherein the plurality of ring terminals is disposed within the plurality of channels.

In an embodiment, the wire guide and retention unit includes a cover mounted on the main body, the cover including at least one wire guide and retention feature that captures a plurality of control wires extending between the control unit and at least one other component of the power tool.

In an embodiment, the cover and the main body mate to form a discrete compartment within each channel, each compartment having a first opening for receiving a respective one of the plurality of motor lead wires and a second opening for receiving a respective one of the plurality of power wires.

BRIEF DESCRIPTION OF THE DRAWINGS

Example embodiments of the present invention will become more fully understood from the detailed description given herein below and the accompanying drawings, wherein like elements are represented by like reference numerals, which are given by way of illustration only and thus are not limitative of the example embodiments of the present invention.

FIGS. 4A-4C depict various views of a wire guide and retention unit provided within the handle of the fastening tool, according to a first embodiment;

FIGS. 5A-5C depict various views of a wire guide and retention unit provided within the handle of the fastening tool, according to a second embodiment.

DETAILED DESCRIPTION

Example embodiments will now be described more fully with reference to the accompanying drawings.

Figure 1:
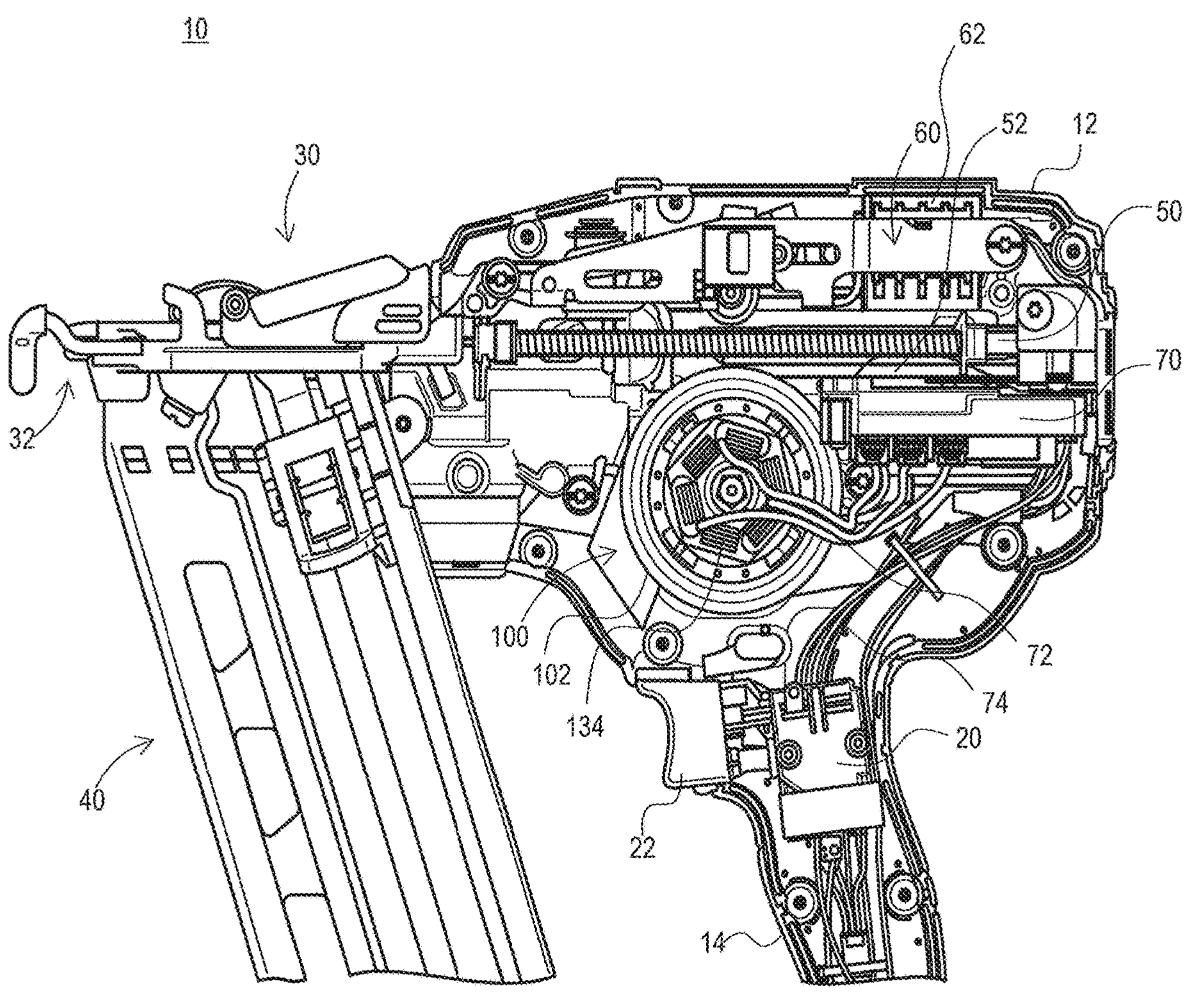
FIG. 1 depicts a side view of a fastening tool with a housing half removed, according to an embodiment.

FIG. 1 depicts a perspective view of a fastening tool 10 (e.g., a nailer) with a housing half removed, according to an embodiment. The fastening tool 10 shown herein includes an outer-rotor brushless DC motor 100. The outer rotor of the motor 100 is integrally formed with a flywheel 102. In an embodiment, the fastening tool 10 further includes a housing 12, an input unit 20 housed within a handle 14 of the housing 12 and coupled to an actuator 22 disposed outside the housing 12, and a control unit 70.

In an embodiment, control unit 70 includes a micro-controller or other programmable control module and an inverter circuit for controlling a commutation of the motor 100. Control unit 70 is coupled to a power source (not shown), which may be a DC power source (e.g., a removable battery pack) or an AC power source (e.g., a 120V AC).

Control unit 70 is also coupled to the input unit 20 via wires 74 to receive input signals indicative of actions desired by the user. The control module regulates a supply of power from the power source to the motor 100 based on a logic signal from the input unit 20. Control unit 70 is coupled to motor terminals via three lead wires 72. The inverter circuit may be, for example, a three-phase inverter circuit including three high-side solid-state switches and three low-side solid-state switches. The switching operation of the solid-state switches is controlled by the control module, which regulates supply of electric power from the power supply to the motor 100.

In an embodiment, fastening tool 10 further includes a nosepiece assembly 30 including a contract trip mechanism 32 coupled to the housing 12, a magazine assembly 40, a driver assembly 50 including a driver 52 and a return mechanism 52, an activation assembly 60, and a solenoid 62, among other components. In an embodiment, actuation of the actuator 22 while contact trip mechanism 32 is in contact with a workpiece causes the solenoid 62 to engage the activation assembly 62. Activation assembly 62 translates forward and engages the driver 52 to initiate driving engagement between the driver 52 and the flywheel 102. In an embodiment, the flywheel 102 includes one or more flywheel rings that form one or more grooves around the outer surface of the flywheel 102. The driver 52 includes corresponding railings that engage the grooves of the flywheel. Rotation of the flywheel 102 causes the driver 52 to accelerate axially and drive a fastener into a workpiece.

The present disclosure is focused on the structure and features of the motor 100. Details of the components and operation of an exemplary fastening tool are beyond the scope of this disclosure and can be found in U.S. Pat. No. 6,971,567 and US. Patent Publication No. 2012/0097729, all of which are incorporated herein by reference in their entirety. It is further noted that while the motor 100 of this disclosure is described with reference to a fastening tool according to an exemplary embodiment, motor 100 may similarly be used in other power tools and other rotary devices.

Figure 2:
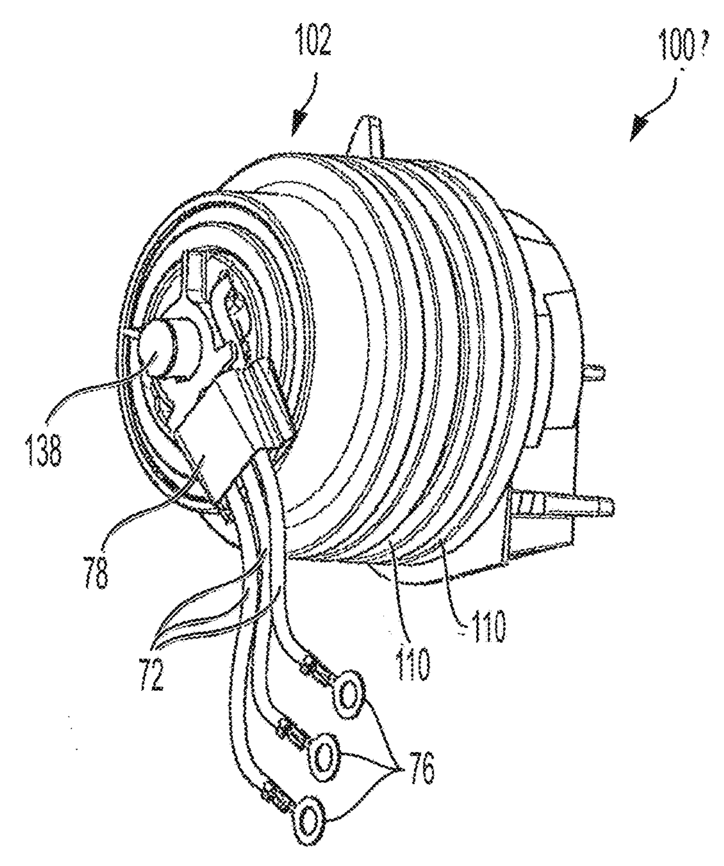
FIG. 2 depicts a perspective view of an outer-rotor BLDC motor in the fastening tool, according to an embodiment.
Figure 3:
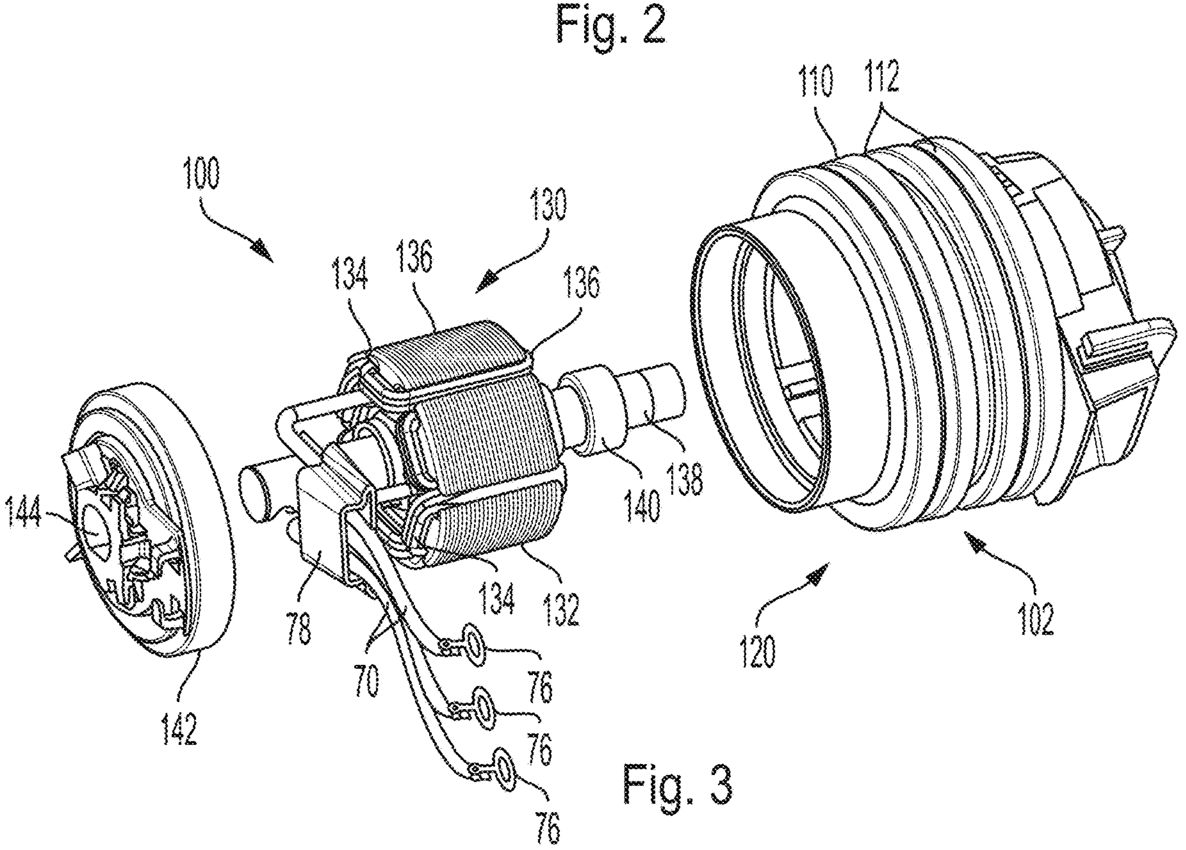
FIG. 3 depicts an exploded view of the outer-rotor BLDC motor, according to an embodiment.

FIG. 2 depicts a perspective view of outer-rotor brushless DC motor 100 in the fastening tool, according to an embodiment. FIG. 3 depicts an exploded view of outer-rotor brushless DC motor 100, according to an embodiment.

In an embodiment, motor 100 includes an outer rotor 120 and an inner stator 130.

In an embodiment, outer rotor 120 has a generally cylindrical piped-shaped body with permanent magnets (not shown) mounted on its inner surface. In an embodiment, an overmold layer may be provided to secure the magnets on the inner surface of the outer rotor 120. In an embodiment, a fan (not shown) may also be formed via the overmold layer, or separately attached to the outer rotor 120 to generate airflow with the rotation of the outer rotor 120.

In an embodiment, outer rotor 120 is provided flywheel 102 having three flywheel annular rings 110 that form grooves 112 therebetween around the outer surface of the flywheel 102. In an embodiment, flywheel 102 is formed integrally with rotor 120 on an external circumferential surface of the rotor 120 having an increased diameter compared to the remainder of the rotor 120. Alternatively, flywheel 102 may be provided as a separate part attached to an outer surface of the rotor 120. Flywheel 102 may be made of metal such as steel.

In an embodiment, stator assembly 130 includes a stator lamination stack 132 having a plurality of stator teeth projecting from an inner core, with slots formed between the stator teeth. Stator windings 134 are formed of magnet wire wound around the stator teeth to fill in the stator slots, defining the phases of the motor 100. In an embodiment, where motor 100 is a three-phase BLDC motor, three windings 134 defining the three phases of the motor 100 are disposed around the stator lamination stack 132, each winding 134 being wound on opposite two teeth across one another. In an embodiment, stator assembly 130 further includes two end insulators 136 attached to the end surfaces of the stator lamination stack 132.

In an embodiment, the stator lamination stack 132 is mounted (e.g., via press-fitting) on a shaft 138. One or more bearings 140 may be further mounted on the shaft 138, with an outer race of the bearings 140 being secured to the rotor 120 to provide axial and radial support for the stator assembly 130 with respect to the rotor 120, while allowing the rotor 120 to rotate freely about the axis of the shaft 138. In an embodiment, a bearing support member 142 is secured to the rotor 120 and includes a central pocket or through-hole 144 that receives one of the bearings 140 therein.

In an embodiment, as the stator windings 134 are energized in a controlled sequence, they create a magnetic field that interacts with the permanent magnets of the outer rotor 120, thus causing rotation of the outer rotor 120 around the stator 130.

In an embodiment, the stator windings 134 are formed of magnet wire wound around stator teeth. In an embodiment, ends of magnet wires, after stator windings 134 are fully wound, are guided out of the stator slots to form the lead wires 72 for electric coupling to the control unit 70. The ends of lead wires 72 may be provided with terminals 76 that facilitate electrical coupling to a connector on the control unit 70. In an embodiment, a guide member 78 is provided to guide the lead wires 72 coming out of the stator 130 in a radial direction.

In the embodiment described above, the control unit 70 is provided adjacent the motor 100, making it possible for the terminals 76 at the ends of lead wires 72 to make a direct connection to the control unit 70. However, in alternative configurations, the control unit 70 may be provided at other locations within the tool at a distance away from the motor 100. In an example, the control unit 70 may be provided at a foot of the handle 14 adjacent a battery receiving portion (not shown) of the tool arranged to removably receive a power tool battery pack. In this arrangement, a direct connection between the motor lead wires 72 and the control unit 70 may be difficult for the manufacturing process.

FIGS. 4A-4C respectively depict perspective views of a wire guide and retention unit 200 provided inside the handle 14 to facilitate a connection between motor lead wires 72 and the control unit 70. The wire guide and retention unit 200 further includes guide and retention features for connecting the control wires 74 coupled to the input unit 20, as well as control wires 75 coupled to other tool components (e.g., thermistor, microswitch, lock-out mechanism, LED, etc.), to the control unit 70.

In an embodiment, the wire guide and retention unit 200 includes a cover 210 and a main body 220. The cover 210 and the main body 220 are shaped to mate together in a form-fitting profile within the handle 14. The cover 210 and the main body 220 mated together include two openings on the two ends of the wire guide and retention unit 200 through which the motor lead wires 72 and a series of power wires 80 coupled to the input unit 70 are respectively received. The cover 210 includes a series of ribs 212 and 214 on its outer surface that receive and guide the control wires 74 and 75 along the outer surface. The handle includes two fastener receptacles 226 that allow the clamshell halves that form the housing to be secured to one another. The cover 210 includes two fastener receptacles 216, which align with threaded receptacles 226 of the handle 14 and allow the fasteners (not shown) passing through one housing half to pass through the fastener receptacles 216 before being secured to the threaded receptacles 226, thus securing wire guide and retention unit 200 to be inside the handle 14.

The main body 220 includes a series of inner walls 228 that form elongate channels therebetween. A series of ring terminals 222 are disposed within the elongate channels, each ring terminal 222 including two leads. The motor lead wires 72 are received from the motor 100 through one of the openings of the wire guide and retention unit 200, into the respective elongate channels, and coupled to first leads of the respective ring terminals. A series of power wire 80 are received from the control unit 70 through the other opening of the wire guide and retention unit 200, into the respective elongate channels, and coupled to second leads of the respective ring terminals. Each ring terminal 222 is fastened to the main body 222 via a fastener 224. The three ring terminals 222 are aligned along an alignment axis that is at an angle of between 30 degrees to 60 degrees relative to a longitudinal axis of the handle 14.

The layered design in this configuration separates the phase wires that supply power to the motor from the control unit 70 and reduces phase to phase contamination. This configuration also provides the ability to expand with additional wire retention layers where needed.

FIGS. 5A-5C respectively depict perspective views of a wire guide and retention unit 300, according to an alternative embodiment. In this embodiment, the wire guide and retention unit 300 includes a cover 310 and a main body 320. The cover 310 and the main body 320 are shaped to together occupy a portion of the space within the handle 14. The cover 310 and the main body 320 mated together include a first series of openings on one end of the wire guide and retention unit 300 through which the motor lead wires 72 are received, and a second series of openings on the other end through which the power wires 80 are received. The cover 310 includes tabs 312 and 314 on its outer surface that receive and guide the control wires 74 and 75 along the outer surface. The cover 310 may be coupled to the main body 320 via a snapping feature.

The main body 320 includes a series of inner walls 328 that form three discrete compartments, each compartment including openings on its two ends. A series of ring terminals 322 are disposed within the compartments, each ring terminal 322 including two leads. The motor lead wires 72 are received through first openings of the compartments to be coupled to first leads of the respective ring terminals 322. Power wire 80 are received through second openings of the compartments to be coupled to second leads of the respective ring terminals 322. Each ring terminal 322 is fastened to the main body 322 via a fastener 324. The inner walls 328 include angular portions to allow the ring terminals 322 to be positioned in a layered configuration along an alignment axis that is at an angle of between 30 degrees to 60 degrees relative to a longitudinal axis of the handle 14. The handle 14 includes fastening receptacles 326 for securing the clamshell housing halves that form the housing together. The wire guide and retention unit 300 includes rounded outer walls formed in close contact with the fastening receptacles 326.

Figure 6A:
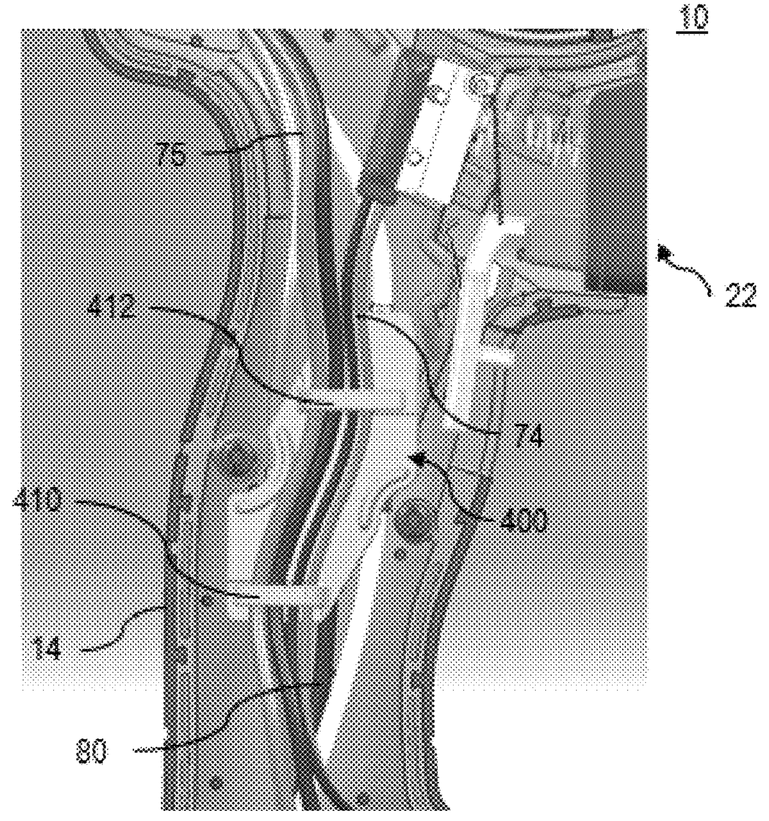
FIGS. 6A-6C depict various views of a wire guide and retention unit provided within the handle of the fastening tool, according to a third embodiment.
Figure 6B:
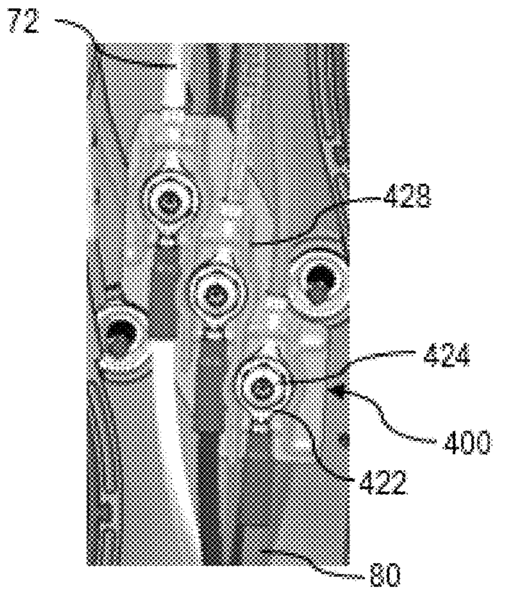
Figure 6C:
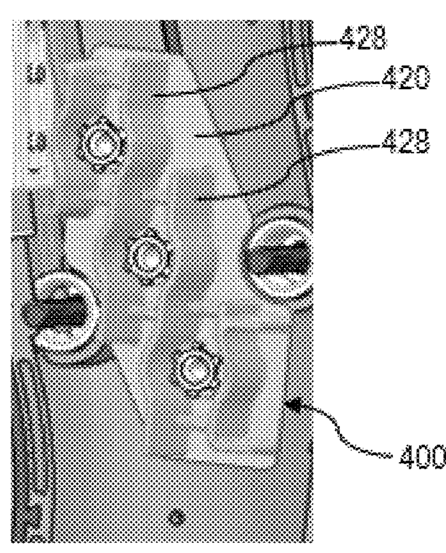

FIGS. 6A-6C respectively depict perspective views of a wire guide and retention unit 400, according to an alternative embodiment. In this embodiment, the wire guide and retention unit 400 includes a single-piece construction with a main body 420 having two surfaces. A first surface of the main body 420 includes tabs 412 and 414 that receive and guide the control wires 74 and 75 along the first surface. A second surface of the main body 420 includes a series of walls 428 that form elongate channels therebetween. A series of ring terminals 422 are disposed within the elongate channels. The motor lead wires 72 are received through first ends of the channels to be coupled to first leads of the respective ring terminals 422. Power wire 80 are received through second ends of the channels to be coupled to second leads of the respective ring terminals 422. Each ring terminal 422 is fastened to the second surface via a fastener 424. Each wall 428 includes rounded portions formed around the ring terminals 422. The ring terminals are positioned in a layered configuration along an alignment axis that is at an angle of between 30 degrees to 60 degrees relative to a longitudinal axis of the handle 14.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "bottom," "lower," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The invention claimed is:

1. A power tool comprising:

a housing including a motor case and a handle;

a motor disposed within the motor case, the motor including a rotor and a stator having a plurality of windings, wherein a plurality of motor lead wires extends from the plurality of windings;

a battery receiving portion provided on an end of the handle configured to receive a removable battery pack;

a control unit configured to receive electric power form the battery pack and output a plurality of power wires; and a wire guide and retention unit disposed within the handle, the wire guide and retention unit including a main body and a plurality of ring terminals fastened to the main body, each ring terminal of the plurality of ring terminals being configured to couple with a respective motor lead wire of the plurality of motor lead wires on one end and with a respective power wire of the plurality of power wires on another end.

2. The power tool of claim 1, wherein main body includes a plurality of elongate walls forming a plurality of channels therebetween, wherein the plurality of ring terminals is disposed within the plurality of channels.

3. The power tool of claim 1, wherein the wire guide and retention unit includes a cover mounted on the main body.

4. The power tool of claim 3, wherein the cover includes at least one wire guide and retention feature that captures a plurality of control wires extending between the control unit and at least one other component of the power tool.

5. The power tool of claim 3, wherein the cover and the main body mate to form a plurality of discrete compartments, each compartment of the plurality of discrete compartments having a first opening for receiving a respective one of the plurality of motor lead wires and a second opening for receiving a respective one of the plurality of power wires.

6. The power tool of claim 1, wherein the plurality of ring terminals is oriented along an alignment axis that is less than 90 degrees relative to a longitudinal axis of the handle.

7. The power tool of claim 6, wherein an angle formed between the alignment axis and the longitudinal axis of the handle is between approximately 30 degrees to 60 degrees.

8. The power tool of claim 6, wherein main body includes a plurality of elongate walls forming a plurality of channels therebetween, wherein the plurality of ring terminals is disposed within the plurality of channels, and wherein each elongated wall includes a rounded portion formed around a respective one of the plurality of ring terminals.

9. The power tool of claim 1, wherein the control unit is located proximate the battery receiving portion at a foot portion of the handle.

10. The power tool of claim 1, wherein the wire guide and retention unit includes a cover mated together with the main body to at least partially form a plurality of compartments, each of the ring terminals being at least partially received in a respective compartment of the plurality of compartments formed by the cover and the main body.

11. The power tool of claim 10, wherein the cover includes a plurality of ribs on its outer surface, and wherein the plurality of ribs receive and guide a plurality of control wires extending from the control unit.

12. The power tool of claim 11, wherein the motor lead wires are coupled to the respective ring terminals in the respective compartments, and the power wires are coupled to the respective ring terminals in the respective compartments, and wherein the plurality of control wires are separated from the plurality of plurality of motor lead wires and the plurality of power wires by at least the cover.

* * * * *